July 21, 1936.  E. L. HOFFMAN  2,047,963
AIRCRAFT ENGINE MOUNT
Filed April 25, 1933
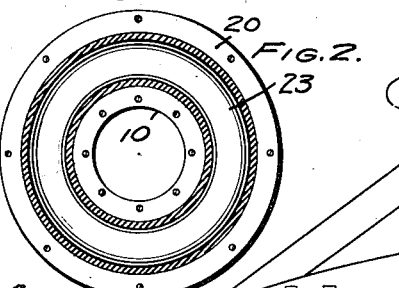
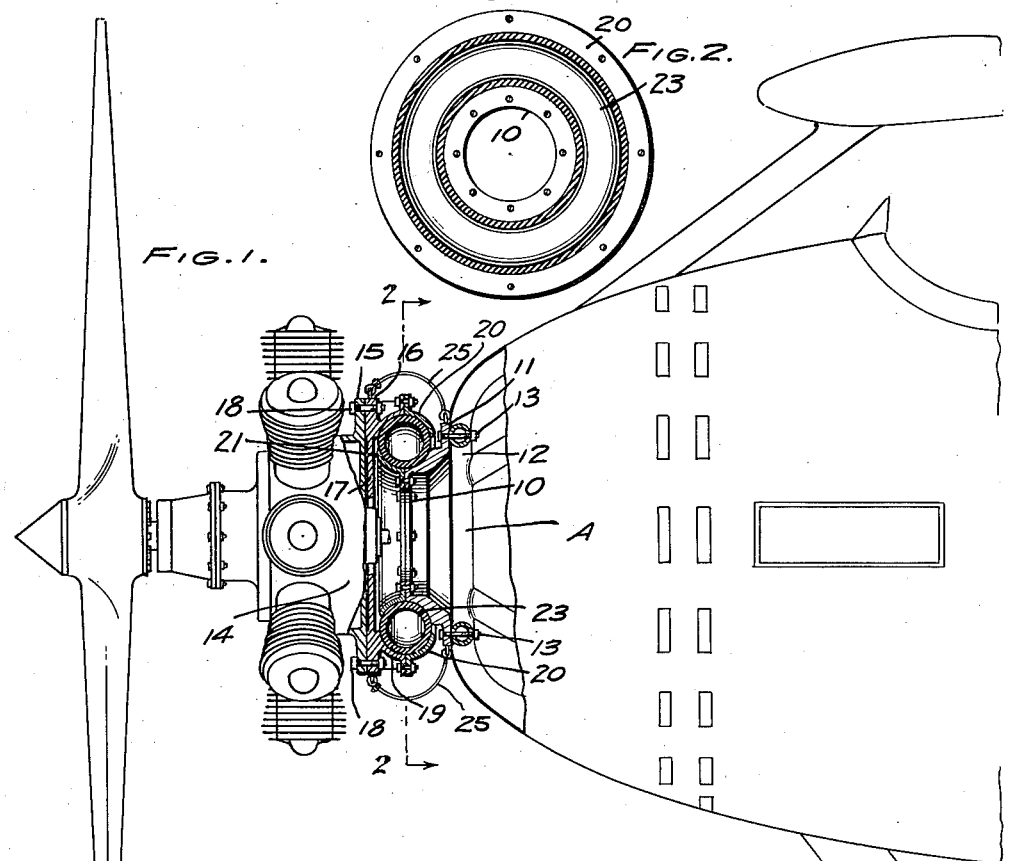
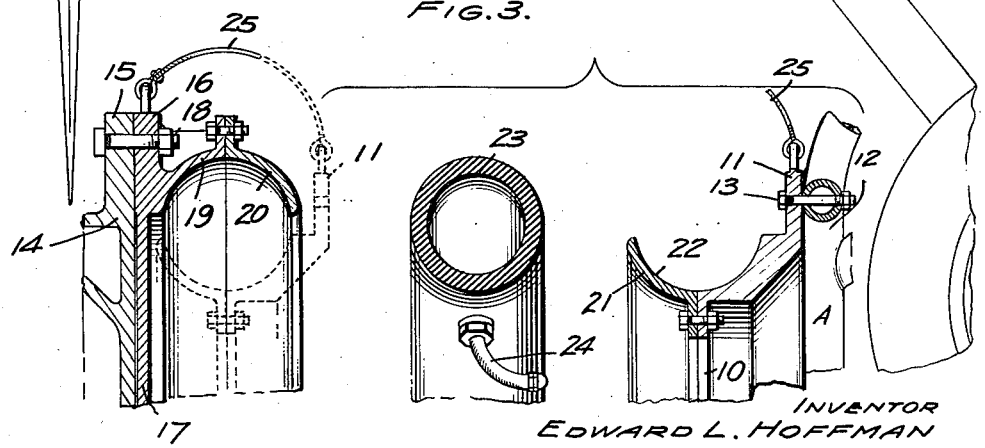
INVENTOR
EDWARD L. HOFFMAN
BY
ATTORNEYS Patented July 21, 1936

2,047,963

UNITED STATES PATENT OFFICE 2,047,963

AIRCRAFT ENGINE MOUNT

Edward L. Hoffman, United States Army,
Dayton, Ohio

Application April 25, 1933, Serial No. 667,827

4 Claims. (Cl. 248—5)

(Granted under the act of March 3, 1883, as
amended April 30, 1928; 370 O. G. 757)

The invention described herein may be manufactured and used by or for the Government for governmental purposes, without the payment to me of any royalty thereon.

The present invention relates, generally, to engine mounts, and more particularly to improvements in resilient mountings especially applicable to radial type aircraft engines having inherent lateral vibration. Engines having crank-shafts rotated by reciprocating pistons, which are commonly used in aircraft, are subject to bodily vibrations of relatively small amplitude but relatively great intensity due to causes inherent in their operation. All engines of the type are subject to vibrations or oscillations about an axis coincident with the crank-shaft axis owing to so called torque reactions. Torque reaction it is well recognized, is due to two causes; one of these causes is the presence of expanding gases between the cylinder heads and pistons which applies an equal and opposite force to the cylinder block and crank-pin, thus tending to rotate the block around the crank-shaft center in proportion to the angle of the crank-pins with respect to the plane of the cylinder axis. This is effective at all speeds and tends to produce a very marked and intent bodily vibration especially in radial engines. The other cause commonly referred to as piston inertia is the reactive force applied to the revolving crank-pins and cylinders during the effort of the crank-pins to accelerate the pistons after it has finished its stroke in one direction and enters upon and continues its stroke in the opposite direction, the force of the revolving crank-pins being then applied obliquely through the connecting rod and piston to the cylinder block thus tends to rock the latter toward the right-hand side if the crank-shaft rotates clockwise or towards the left if the crank-shaft rotates counter-clockwise. Torque reaction due to piston inertia is substantially slight at low speeds and increases in proportion to an increase in speed. The vibrations caused by it are of relatively small amplitude and intensity as compared with those produced by gas pressure.

It is, therefore, an object of the present invention to provide a resilient mount that will serve to insulate the engine and fuselage from one another in a manner that shocks and vibrations are effectively cushioned and their transmission from one to the other prevented, whereby incidental strains to the fuselage and other harmful effects are eliminated and the occupants of the aircraft are relieved from disagreeable sensations.

A further object of the present invention is to provide a cushioned mounting in which there will be no metal-to-metal contact and one in which vibrations in all directions will be deadened and absorbed, thus freeing the main supporting frame or fuselage of strains and resultant injuries.

A still further object of the present invention is to provide a readily removable power unit for aircraft, constructed in such a manner that the unit is compactly arranged and may be readily attached to or removed from the aircraft within a minimum period of time, and to provide simple and efficient means for attaching the power unit to the fuselage to permit the unit to have a limited universal movement relative to the fuselage.

The invention will be more fully understood upon reference to the accompanying drawing illustrating a preferred embodiment of my invention, in which:

Fig. 1 is a side view of an aircraft illustrating diagrammatically the installation of the engine mounting of my invention with respect thereto;

Fig. 2 is a sectional view taken on the line 2—2 of Fig. 1; and

Fig. 3 is an enlarged exploded view of the engine mount.

Referring more particularly to the drawing wherein corresponding parts are designated by like numerals throughout the several views thereof, the engine mount, in a preferred embodiment of my invention herein illustrated, comprises a supporting member indicated by numeral 10. This member is provided with a vertically disposed circular flange portion 11, adapted to be secured to the fuselage forward end member 12, by suitable bolts 13, as shown in Fig. 3. The airplane frame is generally indicated at "A", and it will be unnecessary for the purposes of the present invention to describe this frame in any detail inasmuch as it may be of any well-known type or design. The numeral 14 represents the crank case or base casting of a radial type engine, the rear end of which is formed with a transversely extending portion indicated by numeral 15, to which is adapted to be secured the flanged portion 16 of an engine supporting member, generally indicated by numeral 17. The flange portion 16 of the engine supporting member is circular in shape, and is provided with a plurality of openings adapted for registry with a similar number of openings provided in the transversely extending portion of the engine to accommodate the bolts 18, as shown in Fig. 3. The supported member 17 is formed with an outwardly extending annular clamping arm, indicated by numeral 19, the inner surface of which, indicated by numeral 20, is concave in cross-section.

In a similar fashion, the supporting member 10 is formed with an outwardly extending annular clamping arm, indicated by numeral 21, the outer surface of which, as indicated by numeral 22, is convex in cross section. The clamping arms of each of the aforementioned members when in assembled relation, may be defined as being in complemental relation with respect to one another, as shown in dotted line in Fig. 3, to permit the disposing therebetween of a vibration cushioning member herein indicated by numeral 23. This member consists of a casing or jacket, which may be of any material impervious to air, such as rubber composition or textile fabric, or other fibrous tissue which is impregnated with rubber sufficiently to be impervious to air. This casing may be made either closed or, as illustrated in Fig. 3, it may be provided with a valve as indicated by numeral 24 to permit its inflation. When the clamping arms are disposed in complemental relation with respect to one another, it will be noted that surface 20 of the member 17 and the surface 22 of the supporting member 10 are substantially spherical in cross-section, the diameter of which is substantially equal to the outside diameter of the cushioning member 23. It should also be noted that the clamping arm 19 of the member 17 is so arranged as to frictionally engage the outer circumference of the member 23, and that the surface 22 of the clamping arm 21, provided on the supporting member 10, is arranged to frictionally engage the inner circumference of the cushiong member 23. Consequently, when the cushioning member 23 is expanded by the compression of air, the clamping arms of the supported members 17 and the supporting member 10 will be tightly wedged with the cushioning member 23 disposed therebetween and in so doing lateral movement of the engine with respect to the frame "A" will be substantially prevented. It should also be noted that this method of construction eliminates any tendency for metal-to-metal contact between the supported member 17 and supporting member 10, so that the transmission of vibrations and noises due to resistance will be completely absorbed by the cushioning member 23.

For purposes of convenience, the clamping arms of the supporting member 10 and the supported member 17 are split, as shown in Fig. 3, to enable the cushioning member 23 to be easily assembled with respect to these members. Horizontal, as well as vertical, vibrations are thus absorbed and due to the frictional engagement of the cushioning member 23 with respect to the clamping arms of the supported member 17 and supporting member 10, all torque reactions occurring as the result of an increase or decrease in engine speed will be cushioned.

As shown in Fig. 1, safety cables 25 may be secured to the supporting member 10 and supported member 17 so that in the event of deflation of the cushioning member 23, the engine will be prevented from carrying away, and the cables will wind up tight due to the torque reaction.

Various changes in the construction of the embodiment illustrated in the drawing may be made without departing from the spirit of the invention and I do not, therefore, desire to limit myself to the specific construction shown and described, but desire to avail myself of those modifications as may come within the scope of the appended claims.

What I claim as new and desire to secure by Letters Patent is:

1. In an aircraft, the combination, with a radial engine having a base formed with a transversely extending rearward portion, and a frame having a transversely extending forward portion, each having a face approximately perpendicular to the motor axis, and being spaced apart substantially in parallel relation, of a supported member including a flanged portion adapted to be secured to the transversely extending rearward portion of said engine and a supporting member including a flange portion adapted to be secured to the transversely extending forward portion of said frame, each of said members being provided with clamping arms adapted for being disposed in complemental relation but spaced radially from one another, and pneumatic means frictionally engaging said clamping arm for cushioning torque reactions and vibrations inherent in said engine.

2. In an aircraft, the combination, with a radial engine having a base formed with a transversely extending rearward portion, and a frame having a transversely extending forward portion, each having a face approximately perpendicular to the motor axis, and being spaced apart substantially in parallel relation, of a supported member including a flanged portion adapted to be secured to the transversely extending rearward portion of said engine and a supporting member including a flange portion adapted to be secured to the transversely extending forward portion of said frame, each of said members being provided with ring-shaped clamping arms adapted for being disposed in complemental relation and an annular cushion consisting of a jacket having a confined body of air frictionally engaging in each of said clamping arms to floatingly sustain the weight of the supported member with respect to said supporting member and dampen torque reactions and vibrations inherent in said engine while preventing direct contact of said arms with one another.

3. In an engine mounting, as set forth in claim 2, said supported and supporting members having yieldable means interposed therebetween for yieldably retaining said members in coupled relation upon accidental deflation of said annular cushion.

4. In an engine mounting, as set forth in claim 2, the flanged portions of said supported and supporting members having a plurality of radially arranged auxiliary flexible cables connected therebetween for yieldably retaining said members in coupled relation upon accidental deflation of said annular cushion.

EDWARD L. HOFFMAN.